United States Patent
Wan et al.

(10) Patent No.: US 9,345,022 B2
(45) Date of Patent: May 17, 2016

(54) METHOD AND DEVICE FOR ALLOCATING BACKHAUL LINK RESOURCE

(71) Applicant: Huawei Technologies Co., Ltd., Shenzhen (CN)

(72) Inventors: Lei Wan, Shenzhen (CN); Sha Ma, Shenzhen (CN); Yinghui Yu, Shenzhen (CN); Wei Bai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 139 days.

(21) Appl. No.: 13/773,296

(22) Filed: Feb. 21, 2013

(65) Prior Publication Data

US 2013/0163485 A1  Jun. 27, 2013

Related U.S. Application Data

(63) Continuation of application No. PCT/CN2011/074885, filed on May 30, 2011.

(30) Foreign Application Priority Data

Aug. 23, 2010  (CN) .......................... 2010 1 0259730

(51) Int. Cl.
*H04Q 9/00* (2006.01)
*H04W 72/04* (2009.01)
(Continued)

(52) U.S. Cl.
CPC ...... *H04W 72/0426* (2013.01); *H04W 72/0446* (2013.01); *H04W 72/02* (2013.01); *H04W 92/20* (2013.01)

(58) Field of Classification Search
CPC ...................................... H04W 48/08
USPC ........................................... 370/330
See application file for complete search history.

(56) References Cited

U.S. PATENT DOCUMENTS

| | | | |
|---|---|---|---|
| 2008/0089431 A1 | 4/2008 | Van De Beek et al. | |
| 2010/0097978 A1* | 4/2010 | Palanki et al. | 370/315 |

(Continued)

FOREIGN PATENT DOCUMENTS

| | | |
|---|---|---|
| CN | 101448324 A | 6/2009 |
| CN | 101588201 A | 11/2009 |

(Continued)

OTHER PUBLICATIONS

3GPP 36.211 (Sep. 2007, http://www.qtc.jp/3GPP/Specs/36211-910.pdf) and Share Tech Note about it (http://www.sharetechnote.com/html/FrameStructure_DL.html).*

(Continued)

*Primary Examiner* — Wanda Z Russell
(74) *Attorney, Agent, or Firm* — Brinks Gilson & Lione

(57) ABSTRACT

Embodiments of the present invention provide a method and a device for allocating a backhaul link resource. The method includes: selecting, by a first base station, at least one subframe in an uplink (UL) frequency band in a frequency division duplex (FDD) wireless communication system; and allocating the selected at least one subframe as a backhaul link resource between the first base station and a second base station. With the method, the device and the system for allocating a backhaul link resource according to the embodiments of the present invention, a subframe is selected in an unexhausted frequency band in existing bandwidth resources and allocated to a wireless backhaul link. Therefore, the existing bandwidth resources are released, resources are allocated to wireless backhaul links, and costs of the communication system are saved.

12 Claims, 11 Drawing Sheets

(51) Int. Cl.
*H04W 92/20* (2009.01)
*H04W 72/02* (2009.01)

(56) References Cited

U.S. PATENT DOCUMENTS

| | | | | |
|---|---|---|---|---|
| 2011/0216676 | A1* | 9/2011 | Li et al. | 370/281 |
| 2012/0147810 | A1* | 6/2012 | Wang et al. | 370/315 |
| 2012/0163335 | A1* | 6/2012 | Chung et al. | 370/330 |
| 2012/0327841 | A1* | 12/2012 | Lee et al. | 370/315 |
| 2013/0051310 | A1* | 2/2013 | Kim et al. | 370/315 |

FOREIGN PATENT DOCUMENTS

| | | |
|---|---|---|
| EP | 2421299 A1 | 2/2012 |
| WO | WO 2005/067173 A1 | 7/2005 |
| WO | WO 2010093183 A2 | 8/2010 |

OTHER PUBLICATIONS

Office Action issued in corresponding Chinese Patent Application No. 201010259730.5, mailed Jul. 1, 2013, 15 pages.
Written Opinion of the International Searching Authority issued in corresponding PCT Patent Application No. PCT/CN2011/074885, mailed Sep. 8, 2011.
International Search Report issued in corresponding PCT Patent Application No. PCT/CN2011/074885, mailed Sep. 8, 2011.
Huawei, "Relay Frame Structure Design of TDD Mode" Agenda 15.3, 3GPP TSG RAN WG1 Meeting #56bis, Seoul, Korea, Mar. 23-27, 2009. R1-091270.
Samsung, "Guard Period in UL Backhaul Subframes and DL/UL Timing Design" Agenda Item 7.8,1, 3GPP TSG RAN WG1 Meeting #58bis. Miyazaki, Oct. 12-16, 2009. R1-094101.
Catt, "Assignment of Relay Backhaul Subframes in LTE-A" Agenda Item 7.8.1, 3GPP TSG RAN WG1 Meeting #58bis. Miyazaki, Japan, Oct. 12-16, 2009. R1-094149.
Catt, "Backhaul Subframe Allocation and HARQ Operations" Agenda Item 7.5.1.3, 3GPP TSG RAN WG1 meeting #60. San Francisco, USA, Feb. 22-26, 2010. R1-100896.
Catt, "Assignment of Relay Backhaul Subframes in LTE-A" Agenda Item 7.5.1, 3GPP TSG RAN WG1 meeting #59bis. Valencia, Spain, Jan. 18-22, 2010, 4 pages.
Catt, "Backhaul subframe allocation and HARQ operation" Agenda Item 6.6.1, 3GPP TSG RAN meeting #61bis. Dresden, Germany, Jun. 28-Jul. 2, 2010, 7 pages.
LG Electronics, "Backhaul Subframe Allocation for FDD" Agenda Item 6.6.1.3, TSG-RAN WG1 Meeting #61. Montreal, Canada, May 10-14, 2010, 2 pages.

* cited by examiner

METHOD AND DEVICE FOR ALLOCATING BACKHAUL LINK RESOURCE

CROSS-REFERENCE TO RELATED APPLICATIONS

This application is a continuation of International Application No. PCT/CN2011/074885, filed on May 30, 2011, which claims priority to Chinese Patent Application No. 201010259730.5, filed on Aug. 23, 2010, both of which are incorporated herein by reference in their entirety.

FIELD OF THE INVENTION

The present invention relates to the field of communication technologies and, in particular, to a method, a device, and a system for allocating a backhaul link resource.

BACKGROUND OF THE INVENTION

With evolution of wireless communication systems, more cell sites need to be deployed to widen coverage or better support the user's high-rate service requirements. In many scenarios, however, it is not appropriate to configure wired backhaul links for a deployed cell site. For example, when the throughput of a cell site is low, deploying a wired backhaul link is costly and leads to low cost-effectiveness of deploying such cell sites. For another example, some cell sites are deployed in complicated geographic environments, and it is more costly to configure wired backhaul links in such areas than in other common areas, which leads to low cost-effectiveness of deploying such cell sites. In the above scenarios, it is appropriate to deploy wireless backhaul links. By using wireless bandwidth resources, wireless backhaul links are set up for communication. Therefore, configuring wireless backhaul links is cost-effective. For example, in a new generation of communication systems, communication between a repeater and a macro base station may use wireless backhaul links.

Bandwidth resources are required in deploying wireless backhaul links. Existing bandwidth resources in the communication system have been allocated, and applying for new bandwidth resources will further increase costs of the communication system.

SUMMARY OF THE INVENTION

Embodiments of the present invention provide a method, a device and a system for allocating a backhaul link resource so that a resource is allocated to a wireless backhaul link.

An embodiment of the present invention provides a method for allocating a backhaul link resource, including:
  selecting, by a first base station, at least one subframe in an uplink (UL) frequency band in a frequency division duplex (FDD) wireless communication system;
  allocating the selected at least one subframe as a backhaul link resource between the first base station and a second base station.

An embodiment of the present invention provides a device for allocating a backhaul link resource, including:
  a first selecting module, located in a first base station, and configured to select at least one subframe in an uplink (UL) frequency band in a frequency division duplex (FDD) wireless communication system; and
  a first allocating module, configured to allocate the selected at least one subframe as a backhaul link resource between the first base station and a second base station.

With the method, the device and the system for allocating a backhaul link resource according to embodiments of the present invention, a subframe is selected in an unexhausted frequency band in existing bandwidth resources and allocated to a wireless backhaul link for use. Therefore, the existing bandwidth resources are released, thereby resources are allocated to wireless backhaul links, and costs of the communication system are saved.

BRIEF DESCRIPTION OF THE DRAWINGS

To illustrate the technical solutions in embodiments of the present invention or in the prior art more clearly, the following briefly describes the accompanying drawings required for describing the embodiments or the prior art. Apparently, the accompanying drawings in the following descriptions merely show some embodiments of the present invention, and persons skilled in the art can derive other drawings from the accompanying drawings without creative efforts.

DETAILED DESCRIPTION OF THE EMBODIMENTS

Figure 1:
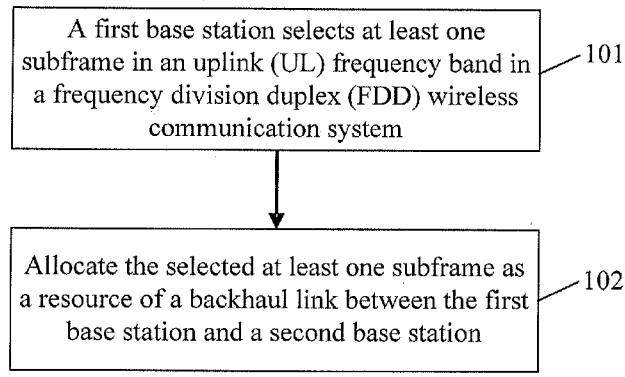
FIG. 1 is a flowchart of a method for allocating a backhaul link resource according to an embodiment of the present invention.

FIG. 1 is a flowchart of a method for allocating a backhaul link resource according to an embodiment of the present invention. This embodiment of the present invention includes:

Step 101: A first base station selects at least one subframe in an uplink (UL) frequency band in a frequency division duplex (FDD) wireless communication system.

Step 102: Allocate the selected at least one subframe as a backhaul link resource between the first base station and a second base station.

The entity for performing the embodiment of the present invention may be a base station such as a macro base station or a pico base station. The macro base station is taken as an example in describing the embodiment of the present invention.

In the embodiment of the present invention, at least one subframe is selected in the uplink (UL) frequency band in the FDD system first. In the FDD system, the UL and a downlink (DL) use the same bandwidth. However, the uplink traffic volume is not equal to the downlink traffic volume currently. The downlink traffic volume is very large, but the uplink traffic volume is far less than the downlink traffic volume. Therefore, some UL resources are idle. Even if the uplink traffic volume increases or even approaches the downlink traffic volume, the above problem still occurs because uplink services have higher spectrum efficiency. For example, a unidirectional repeater is applied to amplify uplink signals only; or an RE (Range extension, range extension) technology or an UL CoMP (Coordinated multipoint, coordinated multipoint transmitting and receiving) technology is applied in a heterogeneous network, which also makes the uplink spectrum efficiency greater than the downlink spectrum efficiency. Therefore, in an FDD system, some UL resources may be idle, and the embodiment of the present invention can select one or more subframes and allocate them for other purposes.

Afterward, the embodiment of the present invention allocates the selected at least one subframe as backhaul link resources. Because wireless communication resources are required in deploying wireless backhaul links, the selected idle FDD UL resources are allocated as backhaul link resources. The backhaul link resources allocated above may be allocated as uplink backhaul link resources or downlink backhaul link resources; or, a part of them is allocated as uplink backhaul link resources and the other part is allocated as downlink backhaul link resources.

With the method for allocating a backhaul link resource according to the embodiment of the present invention, a subframe is selected in an unexhausted frequency band in existing bandwidth resources and allocated to a wireless backhaul link. Therefore, resources are allocated to wireless backhaul links, and costs of the communication system are saved.

Figure 2:
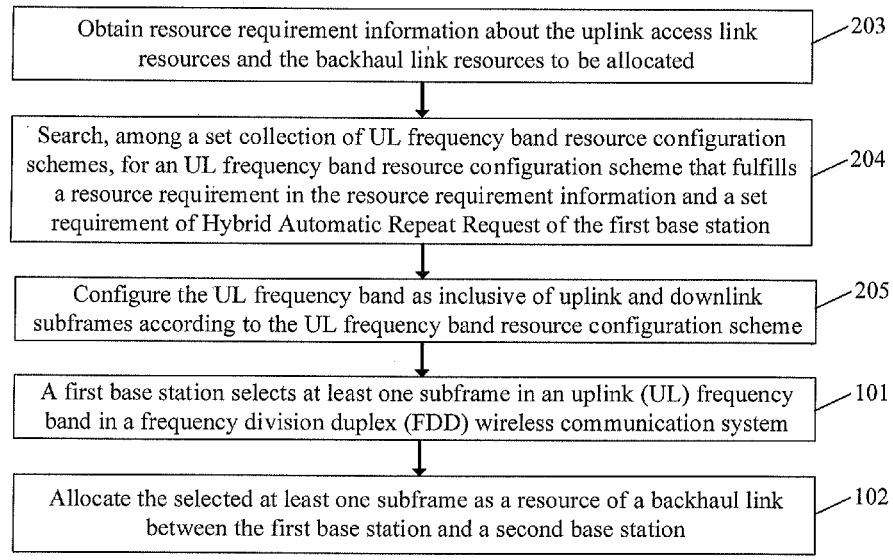
FIG. 2 is another flowchart of a method for allocating a backhaul link resource according to an embodiment of the present invention.

FIG. 2 is another flowchart of a method for allocating a backhaul link resource according to an embodiment of the present invention. This embodiment of the present invention includes:

Step 101: A first base station selects at least one subframe in an uplink (UL) frequency band in a frequency division duplex (FDD) wireless communication system.

Step 102: Allocate the selected at least one subframe as a backhaul link resource between the first base station and a second base station.

The entity for performing the embodiment of the present invention may be a base station such as a macro base station.

This embodiment of the present invention differs from the previously described embodiment in that: before selecting at least one subframe in the uplink (UL) frequency band in the frequency division duplex (FDD) system, this embodiment may further include:

Step 203: Obtain resource requirement information about the uplink access link resources and the backhaul link resources to be allocated.

Step 204: Search, among a set collection of UL frequency band resource configuration schemes, for an UL frequency band resource configuration scheme that fulfills a resource requirement in the resource requirement information and a set requirement of Hybrid Automatic Repeat Request of the first base station.

Step 205: Configure the UL frequency band as inclusive of uplink and downlink subframes according to the UL frequency band resource configuration scheme.

In the embodiment of the present invention, after configured as inclusive of uplink and downlink subframes, the UL frequency band may be re-allocated back as uplink subframes.

In the embodiment of the present invention, the resource requirement information about the uplink access link resources and the backhaul link resources to be allocated is obtained, so as to know how many FDD UL subframes the uplink access link resources and the backhaul link resources of a macro cell and a pico cell need to occupy. In the case that the uplink access link resources required by the macro cell and the pico cell are the same as the required backhaul link resources, the higher the FDD UL spectrum efficiency, the less is the number of occupied FDD UL subframes.

Afterward, according to the resource requirement information, the corresponding UL frequency band resource configuration scheme is searched out among the set collection of UL frequency band resource configuration schemes. This step may be: searching, among the set collection of UL frequency band resource configuration schemes, for a corresponding UL frequency band resource configuration scheme that fulfills a resource requirement in the resource requirement information and a set requirement of Hybrid Automatic Repeat Request. To reuse TDD timing in the existing communication system as far as possible, the collection of UL frequency band resource configuration schemes may be set according to the following table:

TABLE 1

| Uplink-downlink switch-point periodicity | TDD configuration | Subframe number | | | | | | | | | |
|---|---|---|---|---|---|---|---|---|---|---|---|
| | | 0 | 1 | 2 | 3 | 4 | 5 | 6 | 7 | 8 | 9 |
| 5 ms | 0 | D | S | U | | U | D | S | U | | U |
| 5 ms | 1 | D | S | U | | D | D | S | U | | D |
| 5 ms | 2 | D | S | U | D | D | D | S | U | D | D |
| 10 ms | 3 | D | S | U | | U | D | D | D | D | D |
| 10 ms | 4 | D | S | U | | D | D | D | D | D | D |
| 5 ms | 6 | D | S | U | | U | D | S | U | | D |

In the above table, U represents uplink, D represents downlink, S represents special subframe, which includes a downlink switch-point, an uplink switch-point, and a guard interval.

Finally, at least one subframe is selected in an uplink (UL) frequency band in a frequency division duplex (FDD) system according to the UL frequency band resource configuration scheme, and allocated as a backhaul link resource. Allocating the selected at least one subframe as a backhaul link resource may include: allocating the selected at least one subframe as an uplink backhaul link resource or a downlink backhaul link resource respectively so that the backhaul link resource in the UL frequency band in the FDD system and uplink access link resources fulfill time division duplex (TDD) configuration, where the uplink access link resources include unselected subframes in the UL frequency band.

The following uses more detailed examples to describe the embodiment of the present invention.

Figure 3:
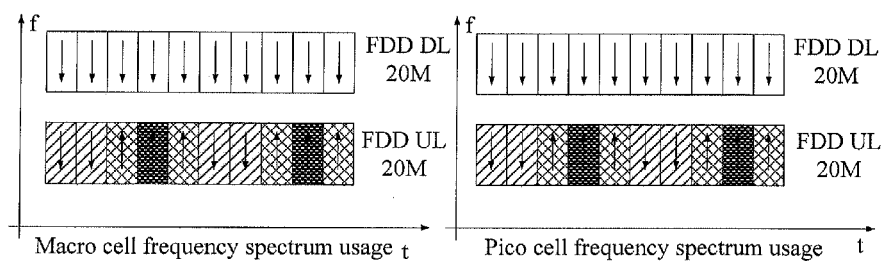
FIG. 3 is a frequency spectrum allocation diagram of a macro cell and a pico cell according to an embodiment of the present invention.

FIG. 3 is a frequency spectrum allocation diagram of a macro cell and a pico cell according to an embodiment of the present invention.

The macro cell access link is:

DL (from a macro cell to a macro cell user equipment (MUE)): uses an FDD DL frequency band, as indicated by the white box of FDD DL in FIG. 3; and UL (from an MUE to a macro cell): uses some subframes in the FDD UL frequency band, as indicated by the grid subframes and the fine-grid subframes in FDD UL in FIG. 3.

The pico cell access link is:

DL (from a pico base station to a pico cell user equipment (PUE)): uses an FDD DL frequency band, as indicated by the FDD DL white subframes in FIG. 3; and UL (from a pico base station to a pico): uses some subframes in the FDD UL frequency band, as indicated by the shaded fine-grid subframes in the FDD UL frequency band in FIG. 3.

Backhaul link:

DL (from a macro cell to a pico cell): uses some subframes in the FDD UL frequency band, as indicated by the slant subframes in the FDD UL frequency band in FIG. 3.

UL (from a pico cell to a macro cell): uses some subframes in the FDD UL frequency band, as indicated by the grid subframes in the FDD UL frequency band in FIG. 3.

Overall, on a macro cell and a pico, the FDD UL resources are divided into 3 parts: an uplink part of the access link; a downlink part of the backhaul link, and an uplink part of the backhaul link of the macro cell or the pico.

For the backhaul in FIG. 3, TDD configuration 0 is selected among the collection of UL frequency band resource configuration schemes, and all timing processes keep consistent with TDD configuration 0 of the existing communication system. The backhaul link uses subframes numbered 0, 1, 2, 4, 5, 6, 7, and 9.

For a macro cell, uplink subframes applicable to the access link are six subframes numbered 2, 3, 4, 7, 8, and 9. Therefore, ACK/NACK feedback of DL transmission data can occur on the six subframes only.

For a pico cell, uplink subframes applicable to the access link are subframe 3 and subframe 8, and therefore, ACK/NACK feedback of DL transmission data can occur on the six subframes only.

For configuration 5, there is only one uplink subframe, and this subframe is available to only backhaul or only the uplink feedback of the access link. Therefore, this configuration is not applicable to backhaul of the TDD mode.

For configuration 2, it has only 2 uplink subframes. If both subframes are applied to the TDD backhaul link, the FDD access link has no uplink subframe for sending uplink data or uplink feedback. With such a TDD configuration, one of the uplink subframes may be selected as an uplink subframe of the backhaul link, and the other subframe is used as an uplink subframe of the access link.

In configuration 4, apart from the inherently configured uplink subframe of TDD, one uplink subframe is left, and this subframe may be used as an uplink subframe of the access link or an uplink subframe of the backhaul link.

In configuration 1 and configuration 3, apart from the inherently configured uplink subframe of TDD, two uplink subframes are left, and both of the two subframes may be used as uplink subframes of the access link; or, one of the subframes is used an uplink subframe of the access link, and the other is used as an uplink subframe of the backhaul link.

In configuration 6, apart from the inherently configured uplink subframe of TDD, three uplink subframes are left, and at least one of the three subframes is used as the uplink subframe of the access link.

With the method for allocating a backhaul link resource according to the embodiment of the present invention, a subframe is selected in an unexhausted frequency band in existing bandwidth resources and allocated to a wireless backhaul link. Therefore, resources are allocated to wireless backhaul links, and costs of the communication system are saved.

Figure 4:
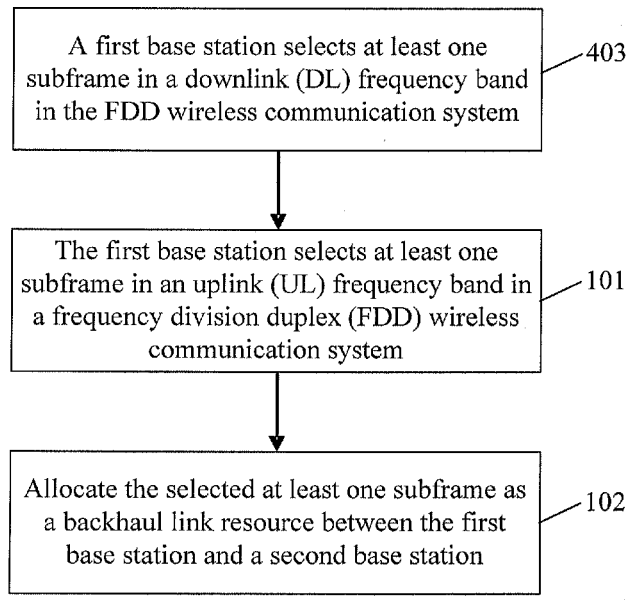
FIG. 4 is another flowchart of a method for allocating a backhaul link resource according to an embodiment of the present invention.

FIG. 4 is another flowchart of a method for allocating a backhaul link resource according to an embodiment of the present invention. The embodiment of the present invention includes:

Step 403: A first base station selects at least one subframe in a downlink (DL) frequency band in an FDD wireless communication system.

Step 101: The first base station selects at least one subframe in an uplink (UL) frequency band in a frequency division duplex (FDD) wireless communication system.

Step 102: Allocate the selected at least one subframe as a backhaul link resource between the first base station and a second base station.

The entity for performing the embodiment of the present invention may be a base station such as a macro base station. The order of step 101 and step 403 in the embodiment of the present invention is not limited. This embodiment of the present invention differs from the previously described embodiment in that: In this embodiment, the subframe is selected in the UL band and the DL band simultaneously for the purpose of being allocated to the backhaul link.

Before selecting at least one subframe in the uplink (UL) frequency band in the frequency division duplex (FDD) system and selecting at least one subframe in the downlink (DL) frequency band in the frequency division duplex (FDD) system, the embodiment of the present invention may further include:

Step 404: Obtain resource requirement information about required uplink and downlink access link resources and backhaul link resources.

Step 405: Search, among a set collection of frequency band resource configuration schemes, for a frequency band resource configuration scheme that fulfills a resource requirement in the resource requirement information and a set requirement of Hybrid Automatic Repeat Request of the first base station.

Step 406: Configure uplink and downlink subframes of the UL frequency band according to the frequency band resource configuration scheme.

In the embodiment of the present invention, the resource requirement information about access link resources and backhaul link resources is obtained, so as to know how many FDD UL or DL subframes need to be occupied as the access link resources and the backhaul link resources of a macro cell and a pico cell. In the case that the access link resources required by the macro cell and the pico cell are the same as the required backhaul link resources, the higher the FDD spectrum efficiency, the less is the number of occupied FDD UL or DL subframes.

Afterward, according to the resource requirement information, the corresponding frequency band resource configuration scheme is searched out among the set collection of frequency band resource configuration schemes. This step may be: searching, among a set collection of resource configuration schemes, for a corresponding frequency band resource configuration scheme that fulfills a resource requirement in the resource requirement information and a set requirement of Hybrid Automatic Repeat Request.

Before allocating the backhaul link resources, the embodiment of the present invention may further include:

Step 407: Allocate at least one subframe in the UL frequency band in the FDD system as a downlink access link resource of the second base station and allocate at least one subframe in the UL frequency band as an uplink access link resource of the second base station according to the resource configuration scheme.

The subframes allocated as the downlink access link resource and the uplink access link resource in the UL frequency band of the FDD system fulfill a time division duplex (TDD) configuration.

In the embodiment of the present invention, the FDD system may also use the UL frequency band and the DL frequency band in a carrier aggregation mode.

Finally, the at least one subframe selected in the UL band in the frequency division duplex (FDD) system is selected to be used as an uplink backhaul link resource, and the at least one subframe selected in the DL band in the frequency division duplex (FDD) system is selected to be used as a downlink backhaul link resource. The uplink backhaul link resource and the downlink backhaul link resource fulfill the TDD configuration on a time domain. If the uplink backhaul link resource and the downlink access link resource include the same subframes, the same subframes may be multiplexed through resources of time-domain, frequency-domain, or time-frequency domain resource blocks.

To reuse TDD timing in the existing communication system as far as possible, the collection of UL and DL frequency band resource configuration schemes may be set according to the following tables:

TABLE 2a

| D-U switch-point periodicity | TDD access | Subframe number | | | | | | | | | |
|---|---|---|---|---|---|---|---|---|---|---|---|
| | | 0 | 1 | 2 | 3 | 4 | 5 | 6 | 7 | 8 | 9 |
| 5 ms | 0 | D | S | U | U | U | D | S | U | U | U |
| 5 ms | 1 | D | S | U | U | D | D | S | U | U | D |
| 5 ms | 2 | D | S | U | D | D | D | S | U | D | D |
| 10 ms | 3 | D | S | U | U | U | D | D | D | D | D |
| 10 ms | 4 | D | S | U | U | D | D | D | D | D | D |
| 10 ms | 5 | D | S | U | D | D | D | D | D | D | D |
| 5 ms | 6 | D | S | U | U | U | D | S | U | U | D |

TABLE 2b

| D-U switch-point periodicity | FDD backhual | Subframe number | | | | | | | | | | Offset |
|---|---|---|---|---|---|---|---|---|---|---|---|---|
| | | 0 | 1 | 2 | 3 | 4 | 5 | 6 | 7 | 8 | 9 | |
| 5 ms | 1 | U | U | D | D | S | U | U | D | D | S | 3 |
| 5 ms | 0 | U | U | D | S | U | U | U | D | S | U | 2 |
| 5 ms | 0 | U | U | D | ■ | U | U | U | D | ■ | U | 2 |
| 10 ms | 6 | U | U | D | D | S | U | U | U | ■ | ■ | 3 |
| 10 ms | 0' | U | U | D | S | U | U | U | ■ | ■ | U | 2 |
| 10 ms | 0'' | U | U | D | ■ | U | U | U | D | ■ | ■ | 2 |
| 5 ms | 1' | U | U | D | D | S | U | U | D | D | ■ | 3 |

In the above table, shaded and oblique subframes are specially received or sent subframes; the subframes preceded by a dot refer to setting of offset subframes. The special treatment of the subframe is intended to identify a method for processing DL timing feedback on the subframe.

The following uses more detailed examples to describe the embodiment of the present invention.

Figure 5:
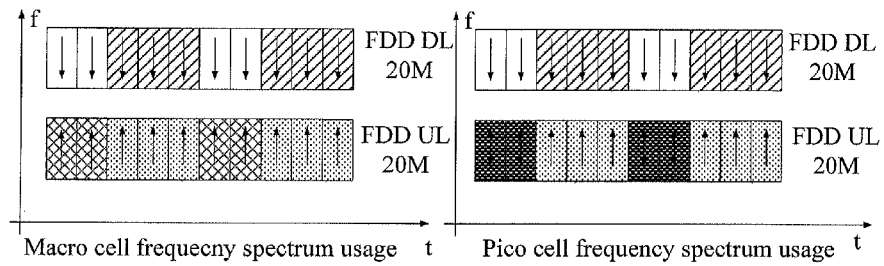
FIG. 5 is a frequency spectrum allocation diagram of a macro cell and a pico cell according to an embodiment of the present invention.

FIG. 5 is a spectrum allocation diagram of a macro cell and a pico cell according to an embodiment of the present invention. FIG. 5 corresponds to TDD access configuration 0 and FDD backhaul configuration 1 in the above table.

As shown in FIG. 5, the backhaul spectrum resources are derived from the FDD DL frequency band and UL frequency band. On the macro cell side and the pico cell side, the backhaul downlink and the DL access link of the FDD system perform time division sharing of the FDD downlink frequency band; and the backhaul uplink and the UL access link of the FDD system perform time division sharing of the FDD uplink frequency band.

Macro cell access link:

DL (from a macro cell to macro cell user equipment (MUE)): uses some subframes in an FDD DL frequency band, as indicated by the white box of FDD DL on the left side of FIG. 5; and UL (from a macro cell user equipment to a macro cell): uses some subframes in an FDD UL frequency band, as indicated by the dotted subframes in FDD DL on the left side of FIG. 5.

The pico cell has two access links:

FDD access link:

DL (from a pico cell (Pico) to pico cell user equipment (PUE)): uses some subframes in an FDD DL frequency band, as indicated by the white box of FDD DL on the right side of FIG. 5; and UL (from a PUE to a pico): uses some subframes in the FDD UL frequency band, as indicated by the dotted shadowed subframes in the FDD UL on the right side of FIG. 5.

TDD access link:

DL (from a pico to a PUE): uses some subframes in the FDD UL frequency band, as indicated by the shaded fine grids in the FDD UL on the right side of FIG. 5.

UL (from a PUE to a pico): uses some subframes in the FDD UL frequency band, as indicated by the dotted shadowed subframes in the FDD UL on the right side of FIG. 5.

Backhaul link:

DL (from a macro cell to a pico): uses some subframes in the FDD DL band, as indicated by the slant shadowed subframes in the FDD DL in FIG. 5.

UL (from a pico to a macro cell): uses some subframes in the FDD UL frequency band, as indicated by the bold grids in FDD UL on the left side of FIG. 5 and the fine shaded grids on the right side of FIG. 5.

As regards the fine shaded grid subframes of pico, downlink (from a pico to a PUE) of the access link of a pico cell and uplink (from a pico to a macro cell) of the backhaul link are sent in the same subframe.

In this subframe, the uplink of the backhaul link from a pico cell to a macro cell and the downlink from a pico cell to a UE multiplex resources on different PRBs. During the process, a PUSCH (Physical Uplink Shared Channel, physical uplink shared channel) and a PUCCH channel may cause interference to a PDCCH (Physical Downlink Control Channel, physical downlink control channel) from a pico to a UE. In this case, from a pico to a UE, an R-PDCCH (Relay-Physical Downlink control channel, relay-physical downlink control channel) may be used to replace the PDCCH channel.

Figure 6:
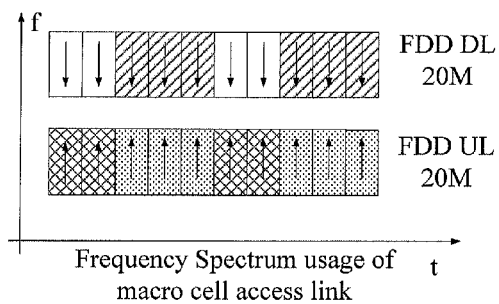
FIG. 6 is a frequency spectrum allocation diagram of a macro cell according to an embodiment of the present invention.

Specifically, the following considerations need to be taken into account for feeding back downlink timing on a macro cell and a pico:

As shown in FIG. 6, for a macro cell access link:

The feedback of the downlink transmission data of a UE may occur on all uplink subframes (dotted shadowed subframes and subframes marked with grid lines), and the feedback of uplink data of the UE may occur on all FDD DL subframes (white box plus slant shadow).

Figure 7:
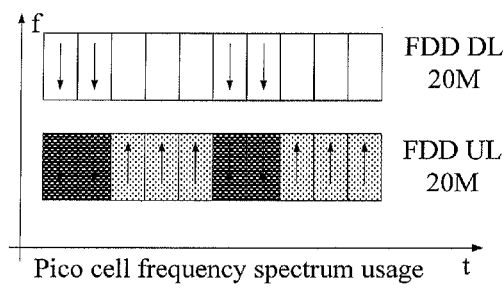
FIG. 7 is a frequency spectrum allocation diagram of a pico cell according to an embodiment of the present invention.

As shown in FIG. 7, for a pico:

There are 2 access links on a pico cell:

FDD access link: 3 downlink subframes are available for transmitting user data and for feedback of uplink transmission data. For the feedback of downlink data transmission on uplink subframes, only a part of uplink subframes (dotted and shadowed) perform the feedback.

TDD access link: The TDD uses currently available TDD configuration, and performs feedback according to an existing TDD timing feedback mechanism.

Figure 8:
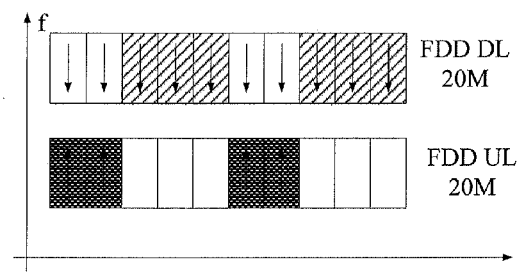
FIG. 8 is a frequency spectrum allocation diagram according to an embodiment of the present invention.

As shown in FIG. 8, for the feedback of uplink and downlink timing on a backhaul link, the following needs to be considered: on FDD DL, it is a downlink backhaul from a macro to a pico; on FDD UL, it is an uplink backhaul from a pico to a macro base station (macro). Therefore, on different frequency bands, the uplink feedback and the downlink feedback are shown in the following table:

TABLE 3

| U | U | D | D | D | | U | U | D | D | D |
|---|---|---|---|---|---|---|---|---|---|---|

The configuration shown in FIG. 5 is compatible with existing TDD configuration 1 with respect to time domain. Therefore, the TDD timing relationship is reusable.

If the uplink and the downlink of the backhaul link are set as opposite to the uplink and the downlink of the TDD access link, that is, TDD configuration 0 is set for the access link and TDD configuration 1 is set for the backhaul link, there are no subframes incompatible with the TDD configuration.

If the uplink and the downlink of the backhaul link are set as opposite to the uplink and the downlink of the TDD access link, that is, TDD configuration 1 is set for the access link and TDD configuration 0 is set for the backhaul link, there are no subframes incompatible with the TDD configuration.

Figure 9:
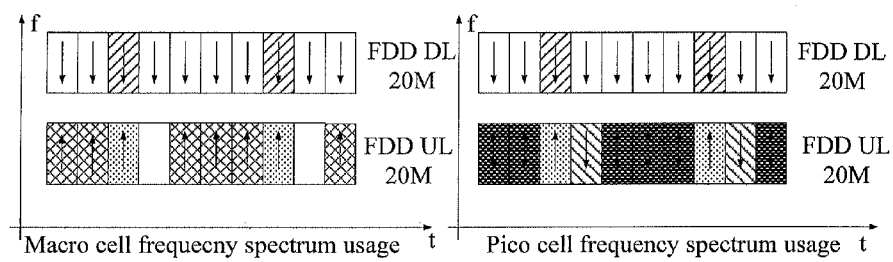
FIG. 9 is a frequency spectrum allocation diagram of a macro cell and a pico cell corresponding to access link TDD configuration 2 with incompatible subframes processed in method 1 according to an embodiment of the present invention.

FIG. 9 is a configuration diagram of 0' in Table 2 (access link TDD configuration 2: DSUDDDSUDD).

It is assumed that the uplink and the downlink of the backhaul link are set as opposite to the uplink and the downlink of the TDD access link, and the subframes incompatible with the TDD configuration are subframe 3 and subframe 8.

For the two subframes that are incompatible on the backhaul link, they may be processed in 4 methods:

Method 1: Send neither backhaul uplink data nor downlink subframes of the backhaul link. In this case, the backhaul link timing may coincide with TDD configuration 0. However, because some downlink subframes of the TDD configuration are not sent, certain scheduling of resources and feedback on the corresponding downlink subframes are disabled.

Figure 10:
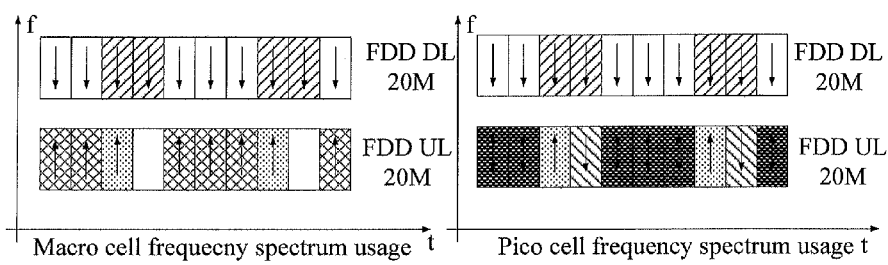
FIG. 10 is a frequency spectrum allocation diagram of a macro cell and a pico cell corresponding to access link TDD configuration 2 with incompatible subframes processed in method 2 according to an embodiment of the present invention.

Method 2: Send no backhaul uplink data, but increase sending of downlink subframes of the backhaul link. In this case, the backhaul link timing may coincide with TDD configuration 0; In this case, the subframes corresponding to downlink of the TDD access link on the macro cell and the pico need to be removed to avoid impact on the TDD downlink access link transmission, as shown in FIG. 10.

Figure 11:
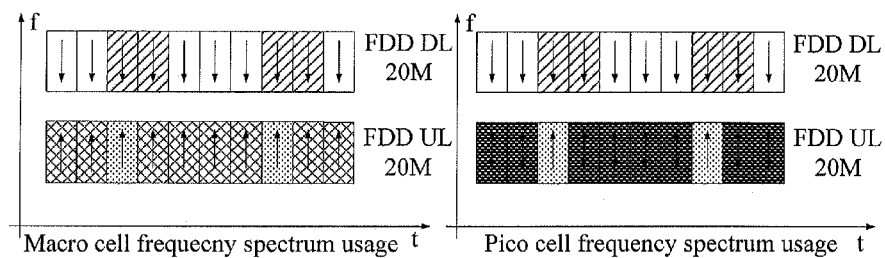
FIG. 11 is a frequency spectrum allocation diagram of a macro cell and a pico cell corresponding to access link TDD configuration 2 with incompatible subframes processed in method 3 according to an embodiment of the present invention.

Method 3: Send uplink data of the backhaul link on subframe 3 and subframe 8. In this case, the feedback of the backhaul link on the two subframes coincides with the FDD n+4 mode; and the configuration change of 0' is shown in FIG. 11.

Figure 12:
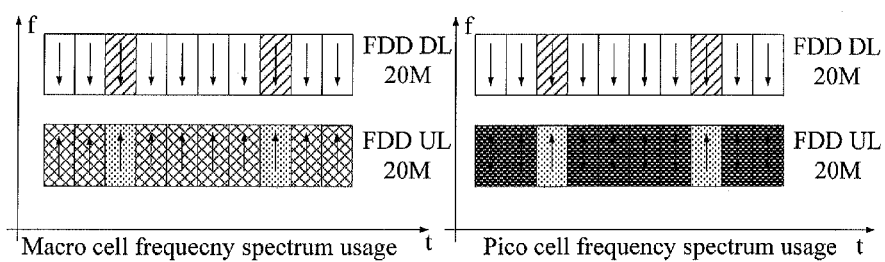
FIG. 12 is a frequency spectrum allocation diagram of a macro cell and a pico cell corresponding to access link TDD configuration 2 with incompatible subframes processed in method 4 according to an embodiment of the present invention.

Method 4: Alternatively, on subframe 3 and subframe 8, keep sending backhaul uplink data, but without sending backhaul downlink data, as shown in FIG. 12.

In this case, in Method 1, because some downlink subframes in the TDD configuration are not used to sent, certain scheduling of resources and feedback on the corresponding downlink subframes are still disabled. Moreover, it is also necessary to set a processing mode of FDD scheduling and feedback on incompatible subframe 3 and subframe 8.

Figure 13:
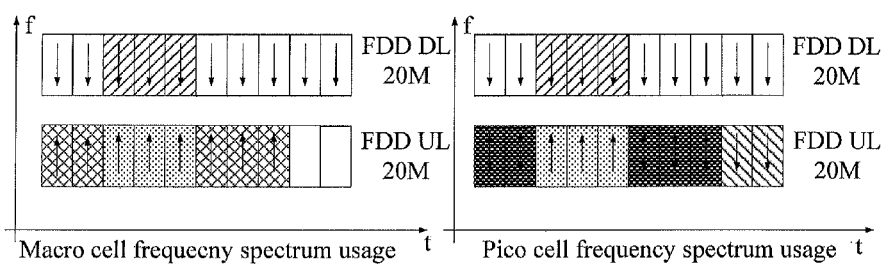
FIG. 13 is a frequency spectrum allocation diagram of a macro cell and a pico cell corresponding to access link TDD configuration 3 with incompatible subframes processed in method 1 according to an embodiment of the present invention.

FIG. 13 shows configuration of 6' in Table 2 (TDD access link configuration 3: DSUUUDDDDD).

It is assumed that the uplink and the downlink of the backhaul link are set as opposite to the uplink and the downlink of the TDD access link, and the subframes incompatible with the TDD configuration are subframe 8 and subframe 9.

For the two subframes that are incompatible on the backhaul link, they may be processed in 4 methods:

Method 1: Send data on neither uplink subframes nor downlink subframes of the backhaul link, but send data on the access link only, and the timing of scheduling and feedback may coincide with TDD configuration 6. In this case, however, because some downlink subframes of the TDD configuration are not sent, certain scheduling of resources and feedback on the corresponding downlink subframes are disabled, as illustrated in FIG. 13.

Figure 14:
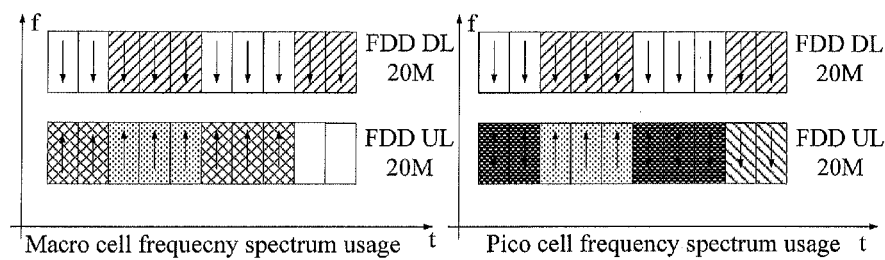
FIG. 14 is a frequency spectrum allocation diagram of a macro cell and a pico cell corresponding to access link TDD configuration 3 with incompatible subframes processed in method 2 according to an embodiment of the present invention.

Method 2: Send only downlink subframes but no uplink subframe on the backhaul link. In this case, the timing of scheduling and feedback may coincide with TDD configuration 6, as shown in FIG. 14.

In this case, the timing of scheduling and feedback may coincide with TDD configuration 6; and the uplink subframes corresponding to downlink of the TDD access link on the macro cell and the pico need to be removed to avoid impact on the TDD downlink access link transmission.

Figure 15:
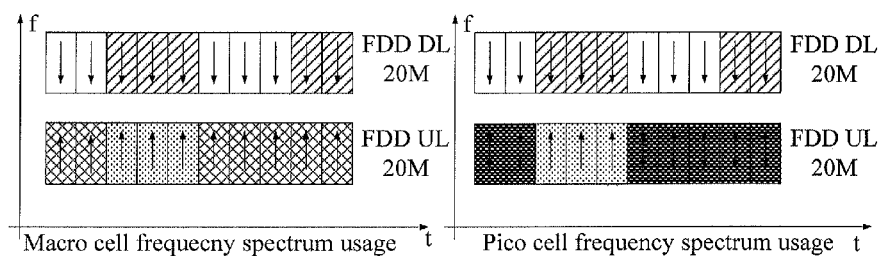
FIG. 15 is a frequency spectrum allocation diagram of a macro cell and a pico cell corresponding to access link TDD configuration 3 with incompatible subframes processed in method 3 according to an embodiment of the present invention.

Method 3: Send data on both uplink and downlink subframes of the backhaul link. In this case, the use of backhaul is shown in FIG. 15. In this case, except the 2 uplink subframes incompatible with TDD configuration 6, other uplink and downlink subframes use the scheduling and feedback timing relationship of TDD configuration. For the 2 uplink subframes incompatible with TDD configuration 6, the PUSCH scheduling and the downlink transmission feedback may coincide with the FDD timing relationship.

Figure 16:
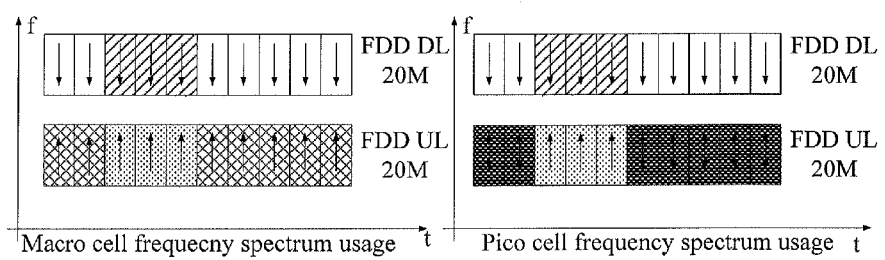
FIG. 16 is a frequency spectrum allocation diagram of a macro cell and a pico cell corresponding to access link TDD configuration 3 with incompatible subframes processed in method 4 according to an embodiment of the present invention.

Method 4: On incompatible subframes, send only uplink subframes but no downlink subframe. In this case, the configuration is shown in FIG. 16.

In this case, in Method 1, because some downlink subframes in the TDD configuration are not sent, certain scheduling of resources and feedback on the corresponding downlink subframes are still disabled. Moreover, it is also necessary to set a processing mode of FDD scheduling and feedback on incompatible subframe 8 and subframe 9.

The configuration of 0'' in Table 2 is: (TDD access link configuration 4: DSUUDDDDDD).

Figure 17:
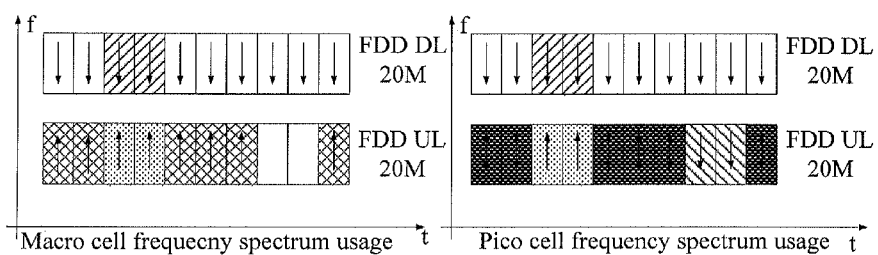
FIG. 17 is a frequency spectrum allocation diagram of a macro cell and a pico cell corresponding to access link TDD configuration 4 with incompatible subframes processed in method 1 according to an embodiment of the present invention.

If the uplink and the downlink of the backhaul link are set as opposite to the uplink and the downlink of the TDD access link, the subframes incompatible with the TDD configuration may be handled in 4 methods:

Method 1: Send neither uplink data nor downlink data of backhaul on the subframes incompatible with the TDD configuration. In this case, the configuration is shown in FIG. 17. The timing of scheduling and feedback may coincide with TDD configuration 0. In this case, however, because some downlink subframes of the TDD configuration are not sent, certain scheduling of resources and feedback on the corresponding downlink subframes are disabled.

Figure 18:
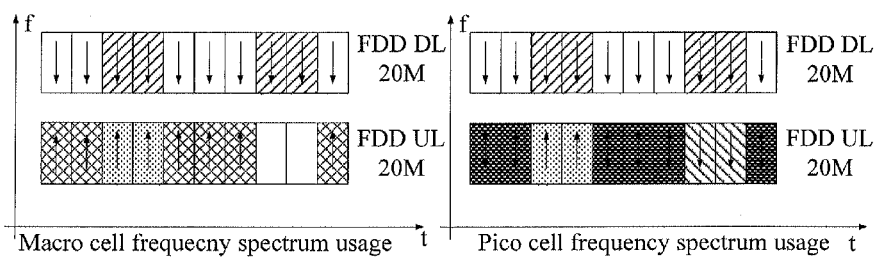
FIG. 18 is a frequency spectrum allocation diagram of a macro cell and a pico cell corresponding to access link TDD configuration 4 with incompatible subframes processed in method 2 according to an embodiment of the present invention.

Method 2: Send no uplink data of backhaul on the subframes incompatible with the TDD configuration. In this case, the configuration is shown in FIG. 18: The timing of scheduling and feedback in this case may coincide with TDD configuration 0.

Figure 19:
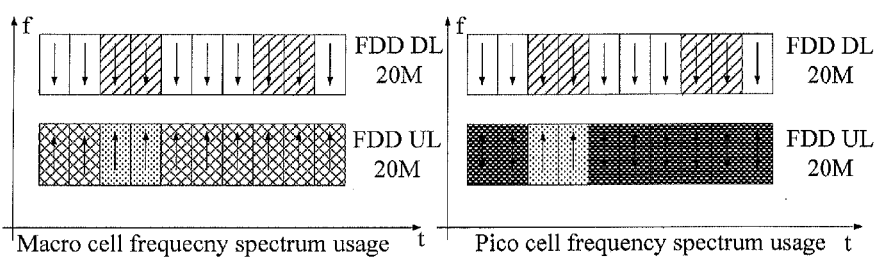
FIG. 19 is a frequency spectrum allocation diagram of a macro cell and a pico cell corresponding to access link TDD configuration 4 with incompatible subframes processed in method 3 according to an embodiment of the present invention.

Method 3: Send also uplink data of backhaul on the subframes incompatible with the TDD configuration, but perform special treatment for the timing of scheduling and feedback. The configuration is shown in FIG. 19: For the 2 uplink subframes incompatible with TDD configuration 0, their PUSCH scheduling and the downlink transmission feedback may coincide with FDD timing.

Figure 20:
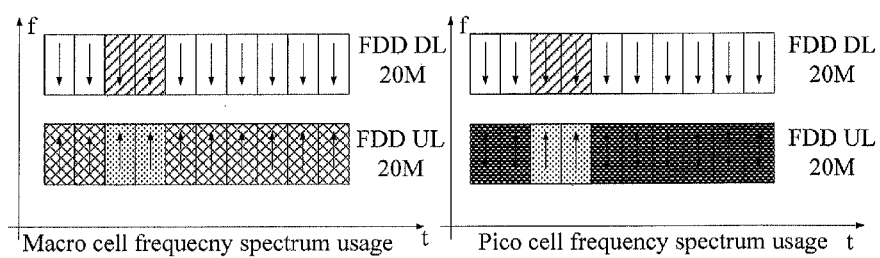
FIG. 20 is a frequency spectrum allocation diagram of a macro cell and a pico cell corresponding to access link TDD configuration 4 with incompatible subframes processed in method 4 according to an embodiment of the present invention.

Method 4: Send uplink subframes but no downlink subframe of backhaul on the subframes incompatible with the TDD configuration. In this case, the configuration is shown in FIG. 20.

In this case, in Method 1, because some downlink subframes in the TDD configuration are not sent, certain scheduling of resources and feedback on the corresponding downlink subframes are still disabled. Moreover, it is also necessary to set a processing mode of FDD scheduling and feedback on incompatible subframe 7 and subframe 8.

The configuration of 0''' in Table 2 is: (TDD access link configuration 5: DSUDDDDDDD).

Figure 21:
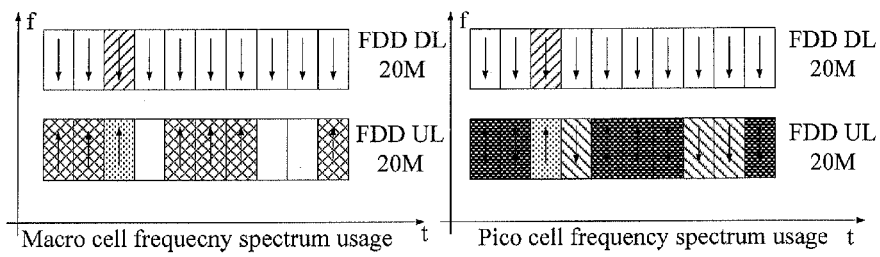
FIG. 21 is a frequency spectrum allocation diagram of a macro cell and a pico cell corresponding to access link TDD configuration 5 with incompatible subframes processed in method 1 according to an embodiment of the present invention.

If the uplink and the downlink of the backhaul link are set as opposite to the uplink and the downlink of the TDD access link, the subframes incompatible with the TDD configuration may be handled in 4 methods:

Method 1: Send neither uplink data nor downlink data of backhaul on the subframes incompatible with the TDD configuration. In this case, the configuration is shown in FIG. 21.

The timing of scheduling and feedback may coincide with TDD configuration 0. In this case, however, because some downlink subframes of the TDD configuration are not sent, certain scheduling of resources and feedback on the corresponding downlink subframes are disabled.

Figure 22:
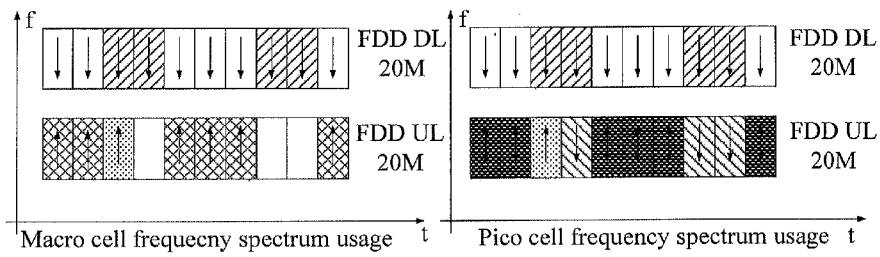
FIG. 22 is a frequency spectrum allocation diagram of a macro cell and a pico cell corresponding to access link TDD configuration 5 with incompatible subframes processed in method 2 according to an embodiment of the present invention.

Method 2: Send downlink data but no uplink data of backhaul on the subframes incompatible with the TDD configuration. In this case, the configuration is shown in FIG. 22; the timing of scheduling and feedback in this case may coincide with TDD configuration 0.

Figure 23:
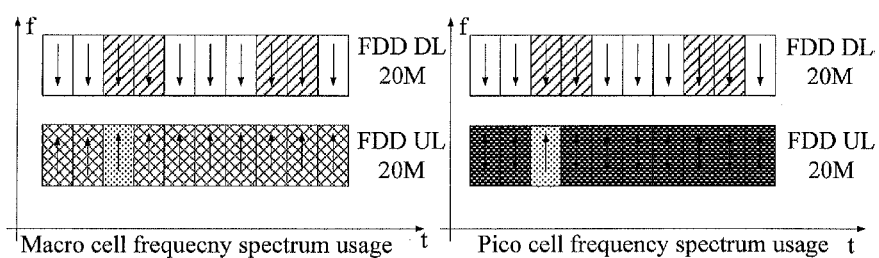
FIG. 23 is a frequency spectrum allocation diagram of a macro cell and a pico cell corresponding to access link TDD configuration 5 with incompatible subframes processed in method 3 according to an embodiment of the present invention.

Method 3: Send also uplink data of backhaul on the subframes incompatible with the TDD configuration, but perform special treatment for their DL feedback. The configuration is shown in FIG. 23:

For subframe 3, subframe 7 and subframe 8 that are compatible with TDD configuration, their scheduling and feedback timing may coincide with the FDD n+4 processing mode.

Figure 24:
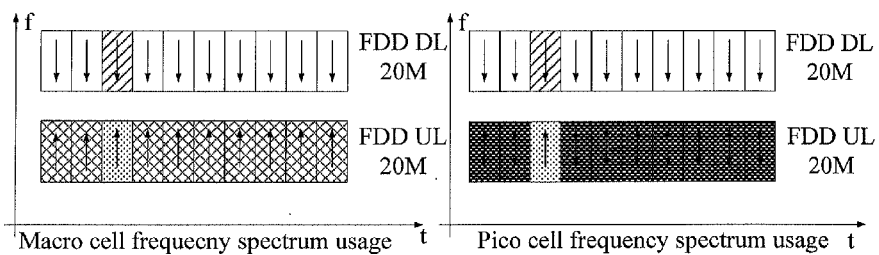
FIG. 24 is a frequency spectrum allocation diagram of a macro cell and a pico cell corresponding to access link TDD configuration 5 with incompatible subframes processed in method 4 according to an embodiment of the present invention.

Method 4: Send uplink subframes but no downlink subframe of backhaul on the subframes incompatible with the TDD configuration. In this case, the configuration is shown in FIG. 24.

In this case, in Method 1, because some downlink subframes in the TDD configuration are not sent, certain scheduling of resources and feedback on the corresponding downlink subframes are still disabled. Moreover, it is also necessary to set a processing mode of FDD scheduling and feedback on incompatible subframe 7 and subframe 8.

The configuration of 1' in Table 2 is: (TDD access link configuration 6: DSUUUDSUUD).

Figure 25:
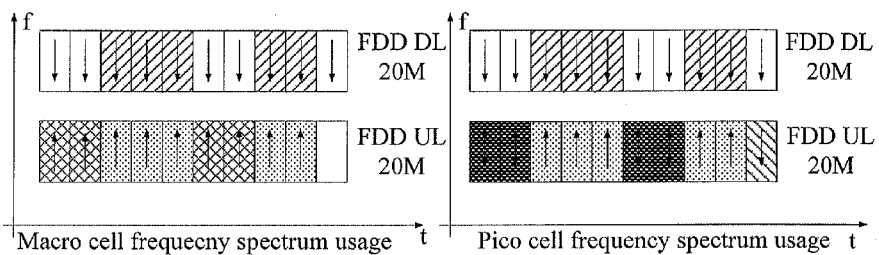
FIG. 25 is a frequency spectrum allocation diagram of a macro cell and a pico cell corresponding to access link TDD configuration 6 with incompatible subframes processed in method 1 according to an embodiment of the present invention.

If the uplink and the downlink of the backhaul link are set as opposite to the uplink and the downlink of the TDD access link, the subframes incompatible with the TDD configuration may be handled in 4 methods:

Method 1: Send neither uplink data nor downlink data of backhaul on the subframes incompatible with the TDD configuration. In this case, the configuration is shown in FIG. 25.

The timing of scheduling and feedback may coincide with TDD configuration 1. In this case, however, because some downlink subframes of the TDD configuration are not sent, certain scheduling of resources and feedback on the corresponding downlink subframes are disabled.

Figure 26:
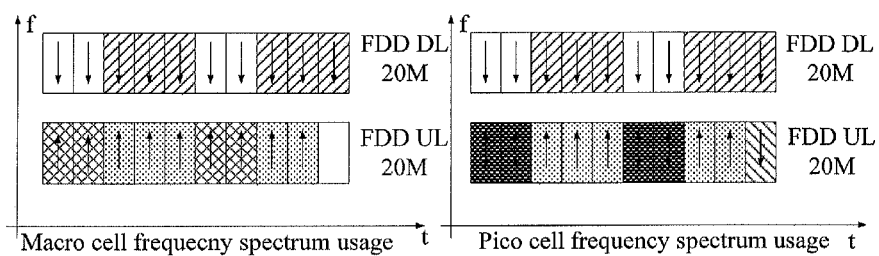
FIG. 26 is a frequency spectrum allocation diagram of a macro cell and a pico cell corresponding to access link TDD configuration 6 with incompatible subframes processed in method 2 according to an embodiment of the present invention.

Method 2: Send no uplink data of backhaul on the subframes incompatible with the TDD configuration. In this case, the configuration is shown in FIG. 26: The timing of scheduling and feedback may coincide with TDD configuration 1.

Figure 27:
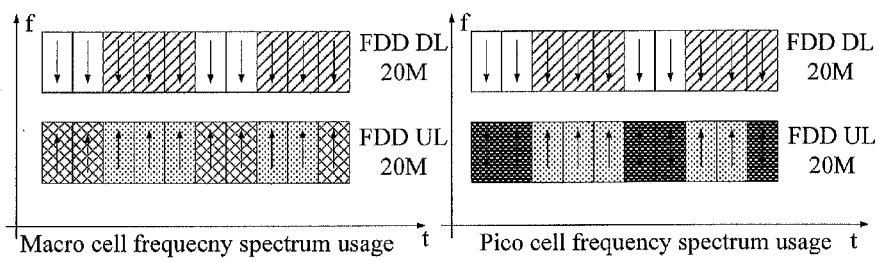
FIG. 27 is a frequency spectrum allocation diagram of a macro cell and a pico cell corresponding to access link TDD configuration 6 with incompatible subframes processed in method 3 according to an embodiment of the present invention.

Method 3: Send also uplink data of backhaul on the subframes incompatible with the TDD configuration, but perform special treatment for their DL feedback. The configuration is shown in FIG. 27:

For subframe 9 incompatible with TDD configuration, the timing of scheduling and feedback may coincide with the FDD n+4 processing mode.

Figure 28:
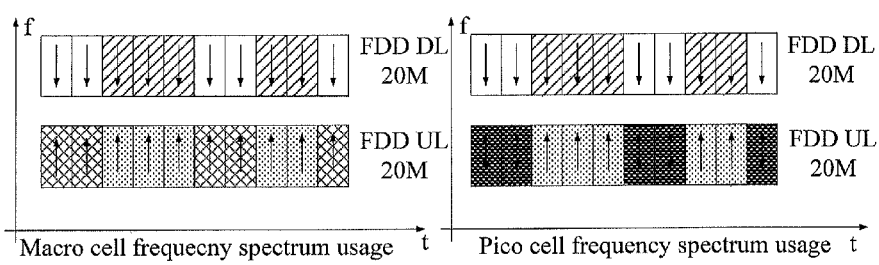
FIG. 28 is a frequency spectrum allocation diagram of a macro cell and a pico cell corresponding to access link TDD configuration 6 with incompatible subframes processed in method 4 according to an embodiment of the present invention.

Method 4: Send uplink subframes but no downlink subframe of backhaul on the subframes incompatible with the TDD configuration. In this case, the configuration is shown in FIG. 28.

In this case, in Method 1, because some downlink subframes in the TDD configuration are not sent, certain scheduling of resources and feedback on the corresponding downlink subframes are still disabled. Moreover, it is also necessary to set a processing mode of FDD scheduling and feedback on incompatible subframe 9.

The various configurations described above may be summarized as follows:

In the case of using uplink and downlink frequency bands of FDD to deploy wireless backhaul, the configuration relationship of the TDD access link and the backhaul link is: The uplink and the downlink of the backhaul link are opposite to the uplink and the downlink of the access link, and, for subframes incompatible with the TDD configuration, there are four processing methods:

Method 1: Send only uplink subframes of the access link but no uplink or downlink subframe of the backhaul link on the incompatible backhaul uplink subframes. That is, some downlink subframes compliant with the TDD configuration are not sent, the TDD timing relationship is basically applicable, and scheduling and uplink feedback of the corresponding uplink subframes are disabled on the TDD downlink subframes that are not sent.

Method 2: Send only uplink subframes of the access link but no uplink subframe of the backhaul link on the uplink subframes incompatible with the TDD configuration. Send downlink backhaul link data in the location of the incompatible uplink subframes on the backhaul link to achieve compliance with the TDD configuration. In this case, the TDD timing method is reusable.

Method 3: Send uplink subframes of both the access link and the backhaul link on the backhaul uplink subframes incompatible with the TDD configuration, and send backhaul downlink data on such subframes at the same time, and therefore, the backhaul link fulfills the TDD configuration and additionally accommodates the backhaul uplink subframes incompatible with the TDD configuration. The subframes incompatible with the TDD configuration are shown in the FDD backhaul part in Table 2, in which a shaded subframe is an incompatible subframe. On this subframe, no DL subframe is sent at first; because the receiving and the sending of backhaul occur on different frequencies, a backhaul DL subframe is additionally sent when the backhaul uplink subframe is sent. In this case, for the uplink subframes incompatible with TDD configuration, their timing of scheduling and feedback timing coincide with the FDD mode.

Method 4: Send only uplink subframes but no downlink subframe of backhaul on the uplink and downlink subframes incompatible with the TDD configuration. In this case, in Method 1, because no backhaul downlink subframe is sent, uplink scheduling and uplink feedback are disabled. Moreover, in Method 3, for the incompatible uplink subframes, special treatment needs to be performed with respect to timing of scheduling and feedback.

With the method for allocating a backhaul link resource according to the embodiment of the present invention, a subframe is selected in an unexhausted frequency band in existing bandwidth resources and allocated to a wireless backhaul link. Therefore, resources are allocated to wireless backhaul links, and costs of the communication system are saved.

Figure 29:
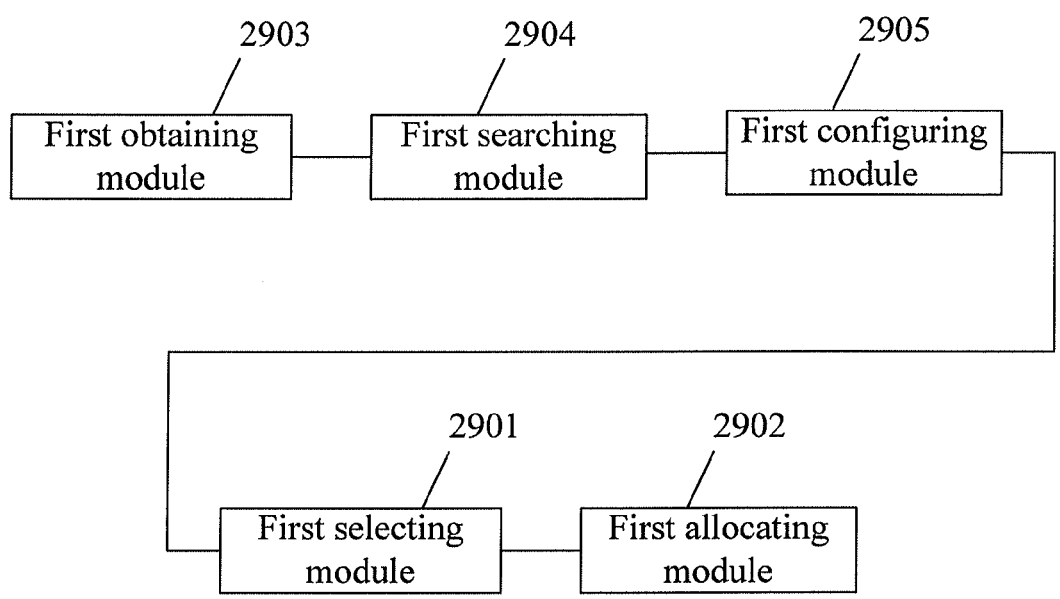
FIG. 29 is a structural diagram of a device for allocating a backhaul link resource according to an embodiment of the present invention.

FIG. 29 is a structural diagram of a device for allocating a backhaul link resource according to an embodiment of the present invention. The embodiment of the present invention includes:

a first selecting module 2901, located in a first base station, and configured to select at least one subframe in an uplink (UL) frequency band in a frequency division duplex (FDD) wireless communication system; and a first allocating module 2902, configured to allocate the selected at least one subframe as a backhaul link resource between the first base station and a second base station.

The device provided in the embodiment of the present invention may further include:

a first obtaining module 2903, configured to obtain resource requirement information about required uplink access link resources and backhaul link resources;

a first searching module 2904, configured to search, among a set collection of UL frequency band resource configuration schemes, for an UL frequency band resource configuration scheme that fulfills a resource requirement in the resource requirement information and a set requirement of Hybrid Automatic Repeat Request of the first base station; and a first configuring module 2905, configured to configure the UL frequency band as inclusive of uplink and downlink subframes according to the UL frequency band resource configuration scheme.

The first allocating module provided in the embodiment of the present invention may be configured to:

allocate the selected at least one subframe as an uplink or downlink backhaul link resource; or allocate at least one of selected at least two subframes as uplink backhaul link resources, and allocate remaining subframes in the at least two subframes as downlink backhaul link resources.

In the embodiment of the present invention, uplink subframes and downlink subframes may be configured in the UL frequency band in the FDD wireless communication system, and the uplink subframes and the downlink subframes in the UL frequency band in the FDD wireless communication system fulfill a TDD configuration.

The embodiment of the present invention may further include:

a second selecting module 2906, located in the first base station, and configured to select at least one subframe in a downlink (DL) band in an FDD wireless communication system.

The allocating module may be configured to:

allocate at least one subframe selected in the UL frequency band in the frequency division duplex (FDD) system as an uplink backhaul link resource; and allocate at least one subframe selected in the DL frequency band in the frequency division duplex (FDD) system as a downlink backhaul link resource.

The subframes of the uplink backhaul link resource and the subframes of the downlink backhaul link resource in the FDD wireless communication system fulfill a TDD configuration on a time domain.

The embodiment of the present invention may further include:

a second allocating module 2907, configured to allocate at least one subframe in the UL frequency band in the FDD system as a downlink access link resource of the second base station and allocate at least one subframe in the UL frequency band as an uplink access link resource of the second base station according to the resource configuration scheme.

The subframes allocated as the downlink access link resource and the uplink access link resource in the UL frequency band of the FDD system fulfill a time division duplex (TDD) configuration.

The embodiment of the present invention may further include:

a multiplexing module 2908, configured to multiplex the same subframe through time-domain, frequency-domain or time-frequency domain resource blocks.

The downlink subframes allocated as the downlink backhaul link resource in the DL frequency band are a part or all of downlink subframes that correspond to uplink subframes on a time domain, where the uplink subframes are allocated as the uplink access link resource of the second base station in the UL frequency band.

The embodiment of the present invention may further include:

a second obtaining module 2909, configured to obtain resource requirement information about required uplink and downlink access link resources and backhaul link resources;

a second searching module 2910, configured to search, among a set collection of frequency band resource configuration schemes, for a frequency band resource configuration scheme that fulfills a resource requirement in the resource requirement information and a set requirement of Hybrid Automatic Repeat Request of the first base station; and a second configuring module 2911, configured to configure uplink and downlink subframes of the UL frequency band according to the frequency band resource configuration scheme.

With the device for allocating a backhaul link resource according to the embodiment of the present invention, a subframe is selected in an unexhausted frequency band in existing bandwidth resources and allocated to a wireless backhaul link. Therefore, resources are allocated to wireless backhaul links, and costs of the communication system are saved.

According to the descriptions above, those skilled in the art clearly understand that embodiments of the present invention may be implemented by means of hardware only, or, preferably in most circumstances, by means of software and necessary universal hardware. Based on such understandings, the essence of or the contribution made by the technical solution of the present invention may be embodied in a software product. The software product on a computer is stored in a storage medium such as computer floppy disk, hard disk or optical disk and incorporates several instructions that cause a computer device (such as a personal computer, a server, or a network device) to execute the method disclosed in each embodiment of the present invention.

The foregoing descriptions are merely preferred exemplary embodiments of the present invention, but not intended to limit the protection scope of the present invention. Any variation or replacement made by persons skilled in the art without departing from the spirit of the present invention shall fall within the protection scope of the present invention. Therefore, the protection scope of the present invention shall be subject to the claims.

What is claimed is:

1. A method for allocating a backhaul link resource, comprising:
    obtaining resource requirement information about an uplink access link resource and a backhaul link resource to be allocated;
    searching, among a set collection of an uplink (UL) frequency band resource configuration schemes, for an UL frequency band resource configuration scheme that fulfills a resource requirement in the resource requirement information and a set requirement of hybrid automatic repeat request of the first base station;
    configuring the UL frequency band as inclusive of an uplink and a downlink subframe according to the UL frequency band resource configuration scheme;
    selecting, by a first base station, at least two subframes in the UL frequency band in a frequency division duplex (FDD) wireless communication system; and
    allocating at least one subframe in the at least two subframes as a downlink backhaul link subframe between the first base station and a second base station, and at least one subframe in the at least two subframes as uplink backhaul link subframe between the first base station and a second base station;
    wherein the at least one uplink backhaul link subframe in the UL frequency band in the FDD wireless communication system and the at least one downlink backhaul link subframe in the UL frequency band in the FDD wireless communication system comply with an existing time division duplexing (TDD) time relationship in a long term evolution (LTE) system.

2. The method according to claim 1, wherein in the TDD time relationship,
    ACK or NACK of the at least one uplink backhaul link subframe is transmitted in one of the at least one downlink backhaul link subframe; and
    ACK or NACK of the at least one downlink backhaul link subframe is transmitted in one of the at least one uplink backhaul link subframe.

3. A method for allocating a backhaul link resource, comprising:
    obtaining resource requirement information about an uplink and a downlink access link resource and a backhaul link resource to be allocated;
    searching, among a set collection of frequency band resource configuration schemes, for an frequency band resource configuration scheme that fulfills a resource requirement in the resource requirement information and a set requirement of hybrid automatic repeat request of the first base station;
    configuring the uplink and the downlink subframe of an uplink (UL) frequency band according to the frequency band resource configuration scheme;
    selecting, by a first base station, at least three subframes in the UL frequency band in a frequency division duplex (FDD) wireless communication system;
    selecting, by the first base station, at least two subframes in a downlink (DL) band in the FDD wireless communication system;
    allocating at least one of the at least three subframes in the UL frequency band in the FDD wireless communication system as an uplink backhaul link resource, allocating at least one of the at least three subframes in the UL frequency band in the FDD wireless communication system as a downlink access link resource of the second base station and allocating at least one of selected at least three subframes in the UL frequency band as an uplink access link subframe of the second base station according to a resource configuration scheme; and
    allocating at least one subframe selected in the DL frequency band in the FDD wireless communication system as a downlink backhaul link resource,
    wherein the at least one downlink access link subframe in the UL frequency band in the FDD wireless communication system and the at least one uplink access link subframe in the UL frequency band in the FDD wireless communication system comply with an existing time division duplexing (TDD) time relationship in a long term evolution (LTE) system.

4. The method according to claim 3, wherein: the subframe of the uplink backhaul link resource and the subframe of the downlink backhaul link resource in the FDD wireless communication system fulfill a TDD configuration on a time domain.

5. The method according to claim 3, wherein: if the uplink backhaul link resource and the downlink access link resource comprise a same subframe, the method comprises:
    multiplexing the same subframe through time-domain, frequency-domain or time-frequency domain resource blocks.

6. The method according to claim 5, wherein: the downlink subframe allocated to the downlink backhaul link resource in the DL frequency band is a part or all of a downlink subframe that correspond to an uplink subframe on a time domain, wherein the uplink subframe is allocated to the uplink access link resource of the second base station in the UL frequency band.

7. A device for allocating a backhaul link resource, comprising:
    a first selecting module, located in a first base station, and configured to select at least two subframes in an uplink (UL) frequency band in a frequency division duplex (FDD) wireless communication system;
    a first allocating module, configured to at least one subframe in the at least two subframes as a downlink backhaul link subframe between the first base station and a second base station, and at least one subframe in the at least two subframes as uplink backhaul link subframe between the first base station and a second base station;
    wherein: the at least one uplink backhaul link subframe in the UL frequency band in the FDD wireless communication system and the at least one downlink backhaul link subframe in the UL frequency band in the FDD wireless communication system comply with an existing time division duplexing (TDD) time relationship in a long term evolution (LTE) system;
a first obtaining module, configured to obtain resource requirement information about an uplink access link resource and a backhaul link resource to be allocated;
a first searching module, configured to search, among a set collection of UL frequency band resource configuration schemes, for an UL frequency band resource configuration scheme that fulfills a resource requirement in the resource requirement information and a set requirement of hybrid automatic repeat request of the first base station; and
a first configuring module, configured to configure the UL frequency band as inclusive of an uplink and a downlink subframe according to the UL frequency band resource configuration scheme.

8. The device according to claim 7, wherein in the TDD time relationship,
ACK or NACK of the at least one uplink backhaul link subframe is transmitted in one of the at least one downlink backhaul link subframe; and
ACK or NACK of the at least one downlink backhaul link subframe is transmitted in one of the at least one uplink backhaul link subframe.

9. A device for allocating a backhaul link resource, comprising:
a first selecting module, located in a first base station, and configured to select at least three subframes in an uplink (UL) frequency band in a frequency division duplex (FDD) wireless communication system;
a second selecting module, located in the first base station, and configured to select at least two subframes in a downlink (DL) frequency band in the FDD wireless communication system;
a first allocating module, located in the first base station, configured to allocate at least one of the at least three subframes selected in the UL frequency band in the FDD wireless communication system as an uplink backhaul link resource; and allocate at least one subframe selected in the DL frequency band in the FDD wireless communication system as a downlink backhaul link resource;
a second allocating module, located in the first base station, configured to allocate at least one of the selected at least three subframes in the UL frequency band in the FDD wireless communication system as a downlink access link resource of the second base station and allocate at least one of the selected at least three subframes in the UL frequency band as an uplink access link resource of the second base station according to a resource configuration scheme,
wherein the at least one downlink access link subframe in the UL frequency band in the FDD wireless communication system and the at least one uplink access link subframe in the UL frequency band in the FDD wireless communication system comply with an existing time division duplexing (TDD) time relationship in a long term evolution (LTE) system;
an obtaining module, configured to obtain resource requirement information about an uplink and a downlink access link resource and a backhaul link resource to be allocated;
a searching module, configured to search, among a set collection of frequency band resource configuration schemes, for a frequency band resource configuration scheme that fulfills a resource requirement in the resource requirement information and a set requirement of hybrid automatic repeat request of the first base station; and
a configuring module, configured to configure the uplink and the downlink subframe of the UL frequency band according to the frequency band resource configuration scheme.

10. The device according to claim 9, wherein: the subframe of the uplink backhaul link resource and the subframe of the downlink backhaul link resource in the FDD wireless communication system fulfill a TDD configuration on a time domain.

11. The device according to claim 9, wherein: if the uplink backhaul link resource and the downlink access link resource comprise a same subframe, the device further comprises:
a multiplexing module, configured to multiplex the same subframe through time-domain, frequency-domain or time-frequency domain resource blocks.

12. The device according to claim 11, wherein: the downlink subframe allocated to the downlink backhaul link resource in the DL frequency band is a part or all of a downlink subframe that correspond to an uplink subframe on a time domain, wherein the uplink subframes is allocated to the uplink access link resource of the second base station in the UL frequency band.

* * * * *